(12) United States Patent
Grossbichler et al.

(10) Patent No.: US 12,735,034 B2
(45) Date of Patent: Sep. 15, 2026

(54) METHOD FOR SPEED CONTROL

(71) Applicant: MAGNA Automotive Europe GmbH, Vienna (AT)

(72) Inventors: Martin Grossbichler, Aschach an der Steyr (AT); Anastasiia Galkina, Linz (AT); Pavlo Tkachenko, Linz (AT); Yanggu Zheng, Schleedorf (AT); Christoph Hoefer, Hargelsberg (AT); Ngoc Anh Nguyen, Graz (AT)

(73) Assignee: MAGNA Automotive Europe GMBH, Vienna (AT)

( * ) Notice: Subject to any disclaimer, the term of this patent is extended or adjusted under 35 U.S.C. 154(b) by 40 days.

(21) Appl. No.: 19/021,425

(22) Filed: Jan. 15, 2025

(65) Prior Publication Data

US 2025/0256713 A1 Aug. 14, 2025

(30) Foreign Application Priority Data

Feb. 12, 2024 (EP) .................................... 24157019

(51) Int. Cl.
*B60W 30/14* (2006.01)
*B60L 15/10* (2006.01)

(52) U.S. Cl.
CPC ........... *B60W 30/143* (2013.01); *B60L 15/10* (2013.01); *B60W 2552/35* (2020.02)

(58) Field of Classification Search
CPC ........... B60L 15/10; B60W 2050/0001; B60W 2552/35; B60W 2720/103; B60W 30/14; B60W 30/143; B60W 50/082; B60W 60/001; B60W 60/0021; B60W 60/0023
See application file for complete search history.

(56) References Cited

U.S. PATENT DOCUMENTS 9,081,651 B2 7/2015 Filev et al.
2014/0277835 A1* 9/2014 Filev .................. G01C 21/3469 701/2
2021/0070317 A1 3/2021 Hitotsumatsu et al.
2021/0331671 A1 10/2021 Kumano et al.
2023/0373530 A1 11/2023 Kume et al.

FOREIGN PATENT DOCUMENTS

WO 2021089150 A1 5/2021

OTHER PUBLICATIONS

European Patent Office search report for EP24157019, mailed Jul. 10, 2024.

* cited by examiner

*Primary Examiner* — Charles J Han
(74) *Attorney, Agent, or Firm* — Jordan IP Law LLC; Todd A. Vaughn

(57) ABSTRACT

A method for speed control of a ground-based vehicle, a computer-implemented method for speed control of a ground-based vehicle, and a control device for speed control of a ground-based vehicle. A speed planner is provided and includes a macro-planner for rapid forward-backward speed planning and a meso-planner for optimizing driving time and energy consumption using an optimization solver. A distance planner is provided and includes a micro-planner for distance control of distance to a vehicle driving ahead. A speed setpoint value is initially calculated by the macro-planner or the meso-planner, the speed setpoint value then optimized by the micro-planner to generate a final speed setpoint value. The ground-based vehicle is then controlled by operating it using the final speed setpoint value.

17 Claims, 5 Drawing Sheets

$$v = \sqrt{\frac{a_{lat}}{k}},\ a_{lat} = v^2 \cdot k \quad a_{tot} = \sqrt{a_{lon}{}^2 + a_{lat}{}^2}$$

$$a_{lon} = \frac{dv}{ds} \cdot v$$

$$a_{lat} = v^2 \cdot k$$

$$\varphi = atan\left(\frac{a_{lon}}{a_{lat}}\right)$$

$$a_{lon} = a_{tot} \cdot \sin(\varphi)$$

$$a_{lat} = a_{tot} \cdot \cos(\varphi)$$

$$v_{i-1}^2 = v_i^2 + 2a_{lon,i-1} \cdot (s_{i-1} - s_i)$$

$$a_i = \frac{v_{i+1}^2 - v_i^2}{2(s_{i+1} - s_i)}$$

$$a_{i-1} = \frac{v_i^2 - v_{i-1}^2}{2(s_i - s_{i-1})}$$

FIG. 4

$$\min_{u,x} \quad f(\epsilon)J_1(a_{x,k}, v_k, \ldots) + J_2(v_k)$$

$$\text{s.t.} \quad x_{k+1} = x_k + 2ds_k\left(u_k - \frac{F_{total}}{m} - \frac{c_2}{m}x_k\right)$$

$$x_k(s_k) \le v_{k,max}^2$$

$$-a_{y,max} \le a_y \le a_{y,max}$$

$$x_k(s_k) \ge 0$$

$$\Gamma_{min}(\alpha, a_{x,min}, a_y, a_{y,max}, p, f_{tire}, D) \le \Gamma(a_x, F_{total}) \le \Gamma_{max}(\alpha, a_{x,max}, a_y, a_{y,max}, p, f_{tire}, D)$$

FIG. 5

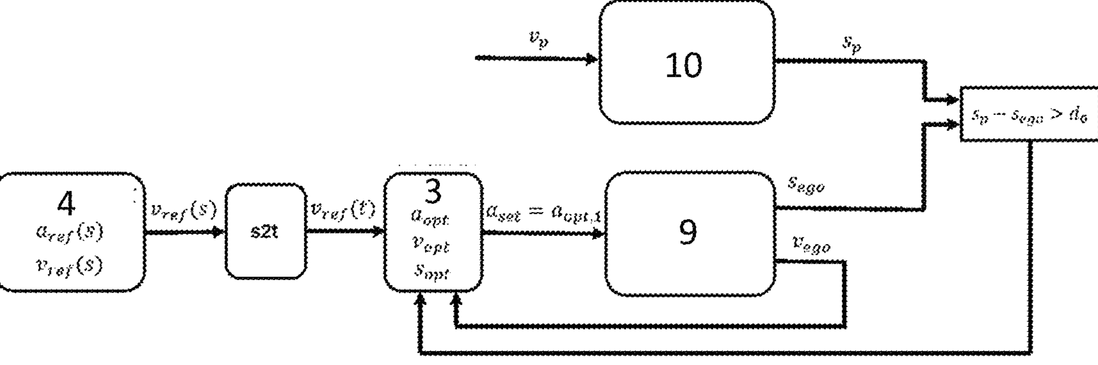

FIG. 8

$$\min_{j,a_x,v,s,\epsilon} \quad (1-\zeta_1)\sum_{k=n}^{n+N}(v_k - v_{ref,k})^2 + \zeta_1\sum_{k=n}^{n+N} a_{x,k}^2 + \zeta_2\sum_{k=n}^{n+N} j_k^2 + \sum_{k=n}^{n+N}\epsilon_k^2$$

$$\text{s.t.} \quad s_{k+1} = s_k + \Delta t v_k$$

$$v_{k+1} = v_k + \Delta t a_{x,k}$$

$$a_{x,k+1} = a_{x,k} + \Delta t j_k$$

$$(a_{x,k} + g\sin(\phi_k))^2 + (c_k v_k^2)^2 \leq a_{k,max}^2$$

$$s_n = s_{ego,meas}$$

$$v_n = v_{ego,meas}$$

$$s_p + v_p \Delta tk - s_k \geq d_0 + \epsilon_k$$

$$-\epsilon_{min} \leq \epsilon_k \leq \epsilon_{max}$$

FIG. 9

$$
\begin{aligned}
\min_{\mathbf{y},\epsilon} \quad & (1-\zeta_1)\sum_{k=n}^{n+N}\left(f_2(\hat{\mathbf{y}}_k) - f_2(\hat{\mathbf{y}}_{ref,k})\right)^2 + \zeta_1\sum_{k=n}^{n+N} f_3^2(\hat{\mathbf{y}}_k) + \zeta_2\sum_{k=n}^{n+N} f_4^2(\hat{\mathbf{y}}_k) + \sum_{k=n}^{n+N}\epsilon_k^2 \\
\text{s.t.} \quad & \left(f_3(\hat{\mathbf{y}}_k) + g\sin(\phi_k)\right)^2 + \left(c_k f_2(\hat{\mathbf{y}}_k)\right)^2 \le a_{k,max}^2 \\
& f_1(\hat{\mathbf{y}}_n) = s_{ego,meas} \\
& f_2(\hat{\mathbf{y}}_n) = v_{ego,meas} \\
& s_p + v_p \Delta t k - f_1(\hat{\mathbf{y}}_k) \ge d_0 + \epsilon_k \\
& -\epsilon_{min} \le \epsilon_k \le \epsilon_{max}
\end{aligned}
$$

FIG. 10

METHOD FOR SPEED CONTROL

CROSS-REFERENCE TO RELATED APPLICATIONS

The present application claims priority under 35 U.S.C. § 119 to European Patent Publication No. EP 24157019.1 (filed on Feb. 12, 2024), which is hereby incorporated by reference in its complete entirety.

TECHNICAL FIELD

The present disclosure relates to a method for speed control of a ground-based vehicle, and to a control device for speed control of a ground-based vehicle.

BACKGROUND

Methods for speed control of motor vehicles are known per se and can assist the driver of a vehicle in the longitudinal control. Speed control systems regulate the speed of the vehicle to a speed setpoint value, wherein an intended driving route can be taken into consideration.

To calculate an optimum speed, for example, a so-called optimum control problem can be solved, which is associated with high computing effort in particular for drive systems of hybrid vehicles on comparatively long driving routes, however, for example, on driving routes of greater than 100 km, in order to carry out these calculations in a reasonable time, for example, in less than 10 seconds, in particular by means of the computing power presently available in hybrid vehicles.

Especially for self-propelled vehicles and for vehicles having adaptive cruise control (ACC), efficient speed, acceleration, and/or jerk planning which is convenient for the driver at the same time, thus the determination of an optimum vehicle status trajectory would be desirable. On the one hand, the trajectory is to be planned or calculated as quickly as possible to enable a short planning time and a long planning horizon; on the other hand, various driving conditions such as road inclination, presence of another vehicle driving ahead on the road, driver comfort, etc. should be able to be taken into consideration in order to achieve a good vehicle behaviour. In addition, the possibility of reducing the energy consumption and taking into consideration other road users to avoid collisions and potentially unsafe situations are to be considered. Presently, there is not yet optimum trajectory generation for autonomously driving vehicles and vehicles having ACC.

SUMMARY

It is an object of the present disclosure to enhance a method for speed control of a ground-based vehicle, a computer-implemented method for speed control of a ground-based vehicle, and a control device for speed control of a ground-based vehicle in this aspect, and in particular, to specify a corresponding method and a device which enable both good driving behaviour of the vehicle and a rapid calculation.

The object is achieved by a method for speed control of a ground-based vehicle, in particular a hybrid or electric vehicle, wherein a speed planner comprises a macro-planner, for rapid forward-backward speed planning, in particular on a long distance horizon, and comprises a meso-planner, for optimizing the driving time and the energy consumption using an optimizing solver, in particular on a moderate distance horizon, wherein a distance planner comprises a micro-planner, for distance control of the distance to a vehicle driving ahead, in particular on a short distance horizon, wherein alternately a speed setpoint value is calculated by the macro-planner or is calculated by the meso-planner, wherein then the speed setpoint value is optimized by the micro-planner in order to output a final speed setpoint value, wherein the ground-based vehicle is thereupon operated using the final speed setpoint value.

The operation of the vehicle using the final speed setpoint value can take place in particular in that a request for a torque is calculated from the speed setpoint value and/or an acceleration setpoint value dependent thereon.

In accordance with the present disclosure, the speed control of a motor vehicle is therefore carried out by an at least two-step method, wherein the first step can be executed in two alternatives: in a first step, optionally, in particular selected by a higher-order method or a higher-order control unit, a speed setpoint value is determined either via a so-called macro-planner, via simple forward-backward speed planning. Alternatively, instead the speed setpoint value is determined by a meso-planner module, which performs an optimization of travel time and energy consumption of the vehicle. The resulting speed setpoint value is optimized still further by a second step, the micro-planner module, which takes vehicles in the surroundings of the ego vehicle into consideration, in particular a vehicle driving ahead, so that a safety distance can be maintained and collisions are avoided. The macro-planner module and the meso-planner module together form a speed planner. The output signal of the speed planner can be modified by the micro-planner, as a distance planner or as a distance and speed planner.

The macro-planner is based on a rapid forward-backward speed planner and supplies optimum control setpoint values without a computing-intensive optimization solver having to be used. The meso-planner minimizes both the driving time and the energy consumption, preferably without use of a specially developed optimizing solver, and can preferably be implemented using an open source optimizing solver in the form of a nonlinear program using, for example, the standard software CasADi with IPOPT-Solver on a Linux-based system. The generation of optimum energy control setpoint values is then simple. It preferably does not permit special vehicle designs to be taken into consideration, but it nonetheless enables energy savings even for electric vehicles (BEV) due to a very simple formulation and implementation.

Both the macro-planner and the meso-planner can use various types of additional data-oriented or driver-oriented conditions, for example, limits, which offer both convenience and also secure optimum control values. The driver-oriented conditions can be parameterized easily depending on the preferred driving style of the driver. The speed planner is thus flexible in its adaptation and can be adapted, for example, to specific target vehicles.

The planned optimum control setpoint value is stabilized by the micro-planner using a distance control. A simpler formulation of the optimization problem is used for the micro-planner in order to make it suitable for embedded software, for example, by using C code which is generated, for example, using the open source solver qrqp. Should no distance control be necessary, a PI controller can instead be used. A flatness-based formulation of the micro-planner enables the elimination of the system dynamics from the secondary conditions, which results in a reduced computing time. The function of the distance control in the micro-planner enables the use of the trajectory planner of the upper layer upon the presence of other vehicles driving ahead.

Advantages which can be implemented using a method in accordance with the present disclosure are as follows.

The speed planner for a specific vehicle can be selected depending on HW performance and driver preferences. Restrictions or conditions, which are based on comfort and driver competence and determine the driving style of the self-propelled BEV, can easily be adapted by the driver via a human-machine interface (HMI). An efficient formulation of the model-predictive distance and speed control (micro-planner) is capable of taking into consideration other road users on the road.

The method is applicable to battery-operated electric vehicles (BEV) in the form of a uniform solution. The planning of optimum control setpoint values for self-propelled automobiles is possible without a special optimization solver. The method is directly applicable for ACC. A distance control is possible. The method enables easily adjustable comfort-oriented and driver-oriented conditions.

As used herein, the term “ground-based vehicle” comprises road vehicles and rail vehicles. The method is in particular suitable for electric and hybrid vehicles.

Refinements of the present disclosure are specified in the dependent claims, the description, and the appended drawings.

The speed planner, in particular, the macro-planner and/or the meso-planner, is preferably configured to take into consideration conditions and limits, namely roadway conditions and/or driver conditions and/or drivetrain conditions of the ground-based vehicle.

The meso-planner preferably uses a standard optimization solver, in particular an open source optimization solver.

The micro-planner is preferably a model-predictive control (MPC). The micro-planner preferably uses a single-shoot formulation and/or a multiple-shoot formulation and/or the micro-planner uses a flatness-based formulation, wherein a system dynamic is eliminated from secondary conditions. The micro-planner can be configured as embedded software.

The final speed setpoint value is preferably determined for a self-propelled electric vehicle (BEV) or for a vehicle with adaptive cruise control (ACC).

A control device for speed control of a ground-based vehicle, in particular a hybrid or electric vehicle, is configured according to the present disclosure to carry out a method as described above. The control device may comprise a computing device that includes a processor to carry out the method.

DRAWINGS

The present disclosure will be described hereinafter by way of example with reference to the drawings.

FIG. 3 shows formulas for calculating the speed setpoint value by the macro-planner in a method in accordance with the present disclosure.

FIG. 4 shows formulas for calculating the acceleration for calculating the speed setpoint value of FIG. 3.

FIG. 5 shows formulas for solving the optimization problem by the meso-planner in a method in accordance with the present disclosure.

FIG. 8 is a block diagram of a micro-planner as a model-predictive control (MPC) with distance and speed control of a method in accordance with the present disclosure.

FIG. 9 shows formulas for calculating the speed setpoint value by the micro-planner as a model-predictive control (MPC) in the form of a multiple-shoot formulation and in the time range in a method in accordance with the present disclosure.

FIG. 10 shows formulas for calculating the speed setpoint value by the micro-planner as a model-predictive control (MPC) upon transformation to area-based coordinates in a method in accordance with the present disclosure.

DESCRIPTION

Figures 1, 2:
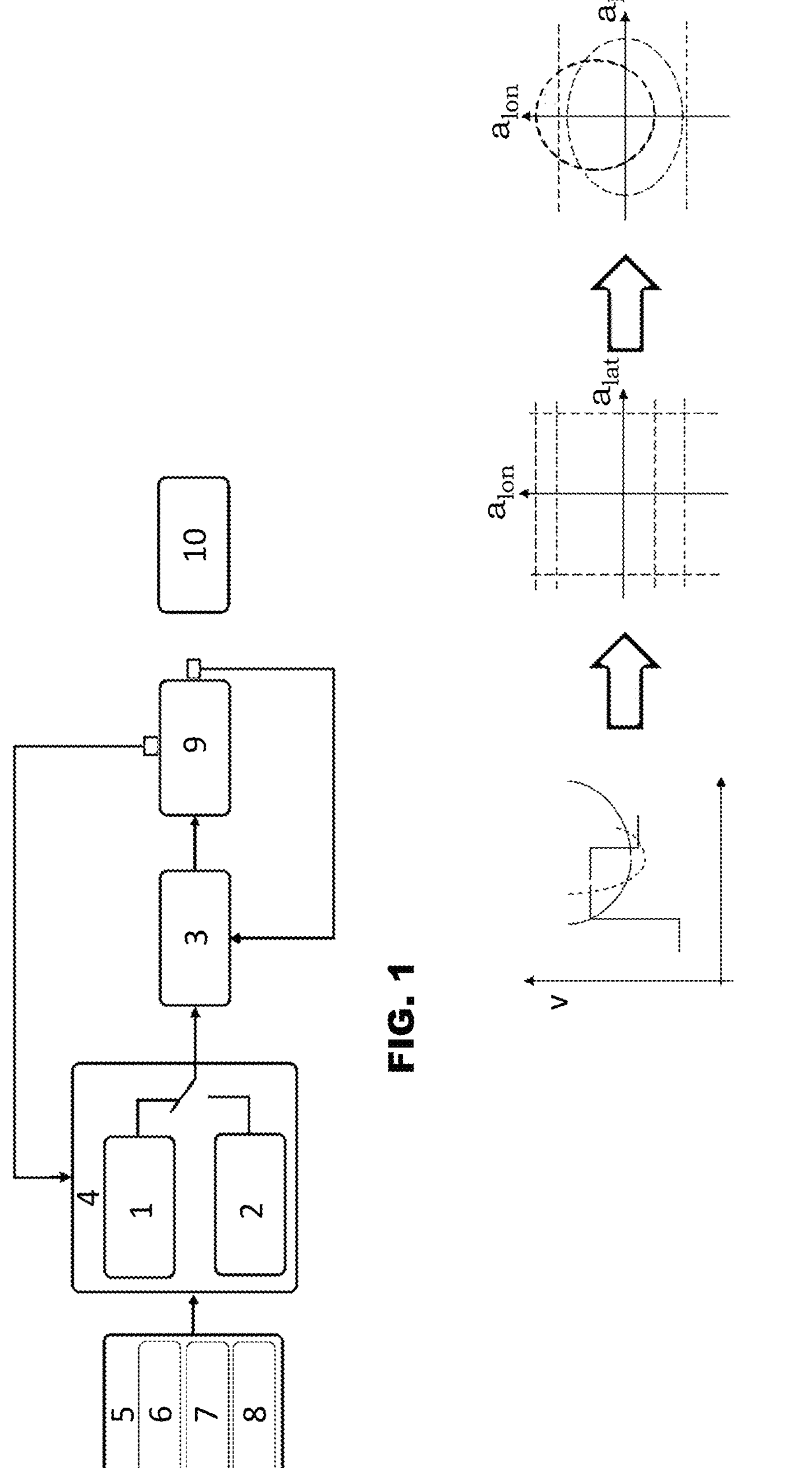
FIG. 1 is a block diagram of a method for speed control of a ground-based vehicle in accordance with the present disclosure.
FIG. 2 is a schematic representation of various conditions and limits for a method in accordance with the present disclosure.

FIG. 1 schematically shows a method according to the present disclosure for speed control of a ground-based vehicle, as a block diagram. The method may be carried out by a control device that comprises a computing device having a processor to carry out the method.

The general approach includes three different modules or algorithms, a macro-planner 1 having a rapid forward-backward speed planner, a meso-planner 2 in the form of an optimization-based optimum energy-speed planner, thus having an optimization solver, and a model-predictive distance and speed control, a micro-planner 3, which can also be formed in some cases by a PI controller (proportional-integral controller), should no distance control be required or the target hardware is not suitable for a model-predictive distance and speed control due to the computing time. The macro-planner 1 and the meso-planner 2 together form a speed planner 4. Various conditions and limits 5 can be taken into consideration in the speed planner 4 and therefore in the macro-planner 1 and/or the meso-planner 2.

The speed planner 4 generates, on the basis of its parameterization and the selection of the conditions and restrictions 5 for the planner, such as roadway conditions and roadway controls 6, driver-oriented and comfort-oriented limits 7 and drivetrain limits 8, optimum control setpoint values for self-propelled electric vehicles (BEV) or ACC vehicles using the information about the road and the path to be travelled. Should other vehicles be present, the distance between the ego vehicle 9 (ego vehicle) and the vehicle 10 driving ahead also has to be monitored to ensure a safe journey. For this purpose, a model-predictive distance and speed control in the form of the micro-planner 3 is used. The speed planner 4 supplies the desired optimum reference speed for the ego vehicle 9. The model-predictive distance and speed control 3 generates the reference acceleration for the electric drivetrain. Should the distance between ego vehicle 9 and vehicle 10 driving ahead be close to a minimum safety distance, the reference speed from the speed planner 4 is ignored, for example, and the distance is regulated so that it remains at a reasonable safety level.

The use of these three algorithms 1, 2, and 3 offers a flexible planning and control functionality depending on the driving conditions and the target hardware for the speed planner.

For the case that the optimum reference speed has to be planned for a long horizon with little computing time, the macro-planner 1 is activated on the basis of a rapid forward-backward speed planner. For example, for 70 km with circular longitudinal and lateral acceleration restrictions, only 3.7 s are required to calculate the planned optimum speed. The interface of the planner can comprise the following: input (vector), distance, curvature, legal limiting values, runway, output (vector), optimum speed profile, longitudinal acceleration profile, time profile, parameter, driver behaviour, drivetrain, brake, vehicle (wheelbase, track width, centre of gravity, etc.).

One possibility for providing boundary conditions 5 in the path area s is shown in FIG. 2 and can be described as follows.

The graph in the left image relates to a limit of the speed v. Calculation of the highest speed (stepped line) from the maximum lateral acceleration. For further use of the minimum of the legal highest speed and the curve-dependent highest speed.

The graph in the middle image relaters to a rectangular limit of the acceleration a, wherein $a_{lat}$ is a lateral acceleration and $a_{lon}$ is a longitudinal acceleration. Application of longitudinal acceleration limits from all restrictions. The limits can be given, for example, by brakes, driver, curves, drivetrain.

The graph in the right image relates to a form limit of the acceleration a. Application of a form derived from parameters. The limits can be given, for example, by brakes, driver, curves, drivetrain.

The forward-backward planner is initially initialized by a first speed estimation, in order to obtain a speed which is not higher than the starting limits specified in the conditions and restrictions 5 for the planner. An iterative method having the following steps is then carried out.

Calculating the lateral acceleration $a_{lat}$; checking the acceleration $a_{lat}$ in accordance with the conditions and restrictions 5 for the planner; limiting the longitudinal acceleration $a_{lon}$ to the limiting value; redetermining the speed v; and taking the minimum of the limit and the calculated speed.

A forward calculation is carried out for the increase of the speed and a reverse calculation is carried out for the reduction of the speed. The calculation algorithm for speed and acceleration is conceived in the distance range. The speed estimation is carried out in consideration of the known road curvature k.

The calculation can be carried out using the formulas indicated in FIG. 3.

The acceleration a required for the speed increase is calculated by forward calculation and the deceleration is calculated by backward calculation on the basis of the further discretized equations. See FIG. 4.

For the case that the energy consumption is to be minimized while maximizing the speed, the optimization-based optimum energy speed planner, the meso-planner 2, has to be activated. It is based on the solution of a nonlinear optimization problem with the aid of the open source program CasADi with the optimization solver IPOPT, but is not restricted to this optimization solver. For example, another open source optimizer can also be used for the implementation. To minimize the driving time, the speed is maximized. This approach enables a simplification of the original time minimization problem without loss of precision at the optimum control setpoint values. Alternatively, the driving time can be minimized directly, wherein a linear behaviour between weighting factor E and an optimum speed setpoint value reduction in the eco-mode can be achieved, which results in better and user-friendly parameterization of the driving modes on the HMI. The optimization problem is shown in FIG. 5.

In the optimization problem in FIG. 5, the following conditions are used, cost functions $J_1$ and $J_2$ including the maximization of the speed or of the energy consumption with recuperation, $F_{total}=F_{roll}+F_{grade}$, $F_{roll}=mgc_r$, $F_{grade}=mg\sin(\phi)$, $c_2=(c_d\,\rho_{air}\,A)/2$, $\epsilon$ is a weighting factor, $x_k=\cup^2$ and $u_k=a_{x,k}$. The IPOPT solver is used with $x_{init}(s_k)=x_{prev,opt,interp}(s_k)$, wherein $x_{prev,opt,interp}$ is the interpolated optimum solution of the previous planned trajectory. The cost function can also include the minimization of the acceleration or the jerk to ensure better comfort.

The last boundary condition in the optimization problem can consist of the driver-oriented and/or comfort-oriented limit, wherein $\Gamma_{min}(\alpha,a_{x,min},a_y,a_{y,max},p,f_{tire})$, $\Gamma(a_x,F_{total})$ and $\Gamma_{max}(\alpha,a_{x,min},a_y,a_{y,max},p,f_{tire})$ are the functions which describe the various options of the restriction formulation. Various driver-oriented styles can be made available to the optimization-based meso-planner for the optimum energy speed from the block conditions and restrictions 4 by suitable selection of the factor p, see FIG. 6. p=1 corresponds to the rhombus. p<1 are functions within the rhombus, p>1 corresponds to the functions outside the rhombus with circular limiting function.

In addition, various driving modes can be defined, such as, for example:

Eco: save energy. Weight of the cost function $\epsilon=750$,

Fast: does not save energy, shortens the travel time. Cost function weight $\epsilon=250$, Comfort: reduce Lat/Long acc/decel. Weight of the cost function $\epsilon=500$, Sport: maximum width/length rise/fall are permitted. Cost function weight $\epsilon=250$, and User-defined: weight of the cost function $\epsilon=500$.

Sub driving modes can be defined as follows:

Eco +: increases the weight by 50,

Fast +: reduces the weight by 50,

Comfort +: reduces the driving skill by 0.1, and

Sport +: increases the min/max values for acceleration or deceleration by 0.5

Figure 6:
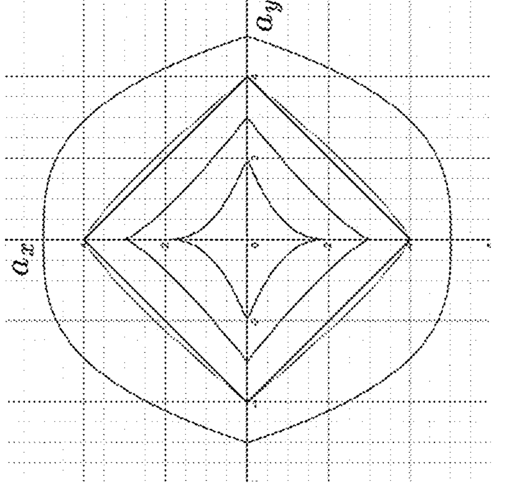
FIG. 6 is a schematic representation of various conditions and limits, with respect to the driver competence and to driving modes, for the meso-planner of a method in accordance with the present disclosure.

FIG. 6 therefore shows a possible selection of the conditions and restrictions 4 on the basis of the driver competence and the driving modes.

Figure 7:
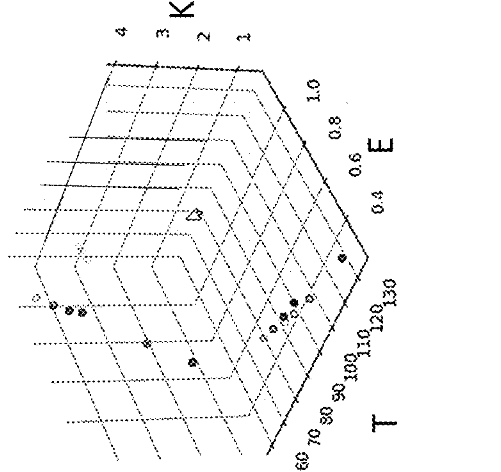
FIG. 7 is a schematic representation of the dependence of the driving time T, the comfort K, and the energy consumption E on the selected driving modes upon application of a method in accordance with the present disclosure.

Depending on the selected means of transport, different travel times and energy consumptions can be achieved, see FIG. 7, with the coordinates: travel time T, energy E, and comfort K. FIG. 7 shows a dependence of the driving time T, the comfort K, and the energy consumption E on the selected driving modes.

The block conditions and limits 5 for the speed planner 4 can also provide various data-controlled limits both for the rapid forward-backward speed planner 1 and for the optimization-based optimum energy speed planner 2. For example, the friction $f_{tire}$ can be estimated on the basis of the measurements or the learned behaviour of the driver D can additionally be incorporated in the limits $\Gamma_{min}$ and $\Gamma_{max}$. Restrictions for the drivetrain such as the maximum possible acceleration/deceleration are also provided by this block. In addition, additional slack variables can be incorporated in the boundary conditions in order to loosen the conditions and reduce the calculation time. For the distance of 25.6 km, the calculation takes, for example, 0.9-1 s for p=1 and 1.1 s for p=0.2. If ACC is used and for a horizon of 300 m, for example, it takes 0.43 s to find optimum speed setpoint values which are provided to the micro-planner 3.

The object of the micro-planner 3 is to stabilize the optimum reference movement supplied by the speed planner 4 based on the available measurements and driving situations. The model-predictive distance and speed control is proposed in order to track the optimum reference trajectory generated by the speed planner 4, for example, by the rapid forward-backward speed planner, and to keep the distance from the ego vehicle 9 to the vehicle 10 driving ahead, thus $s_p$-$s_{ego}$, at a safe limit $d_0$. This object can be solved by MPC. The generated reference trajectory in the path s range can be recalculated in the time t range, see FIG. 8.

FIG. 8 shows a block diagram of the micro-planner 3 with distance and speed control.

The MPC in the form of a multiple-shoot formulation and in the time range can be formulated as shown in FIG. 9.

In this case, $j=[j_n, \ldots, j_{n+N}]$, $a_x=[a_{x,n}, \ldots, j_{x,n+N}]$, $\cup=[\cup_n, \ldots, \cup_{n+N}]$, and $s=[s_n, \ldots, s_{n+N}]$ are jerk, longitudinal acceleration, vehicle speed, and path vectors, respectively. The cost function can be calculated with the aid of the weighting factors $\xi_1$ and $\xi_2$. The inequality conditions can be loosened by slack variables, for example, by $\epsilon=[\epsilon_n, \ldots, \epsilon_{n+N}]$.

One possibility for reducing the number of the optimization variables is to express the predicted states as a function of the control input. In this way, the cost function is only a function of the control input j. While the evaluation of the prediction function introduces additional computing complexity, the reduction is enabled by the reduced dimensionality of the problem and the reduced number of equality conditions. In addition, the secondary conditions for the speed difference between the ego vehicle and the vehicle travelling ahead can additionally be added in order to enable a smoother distance control. This approach can be implemented with the aid of the open source optimum quadratic solver qrqp, but is not restricted to this solver and can also be solved using other quadratic or nonlinear solvers.

A further possibility for reducing the number of equality conditions which are necessary for the description of the vehicle dynamics is to transform the original discrete dynamic system into area-based coordinates so that all system states and system inputs are static algebraic functions of the flat system output $y_k$.

In FIG. 10, $s_k=f_1(y_{\hat{k}})$, $\cup_k=f_2(y_{\hat{k}})$, $a_{x,k}=f_3(y_{\hat{k}})$, and $j_k=f_4(y_{\hat{k}})$ are, with a sequence of flat outputs $y_{\hat{k}}$ corresponding to the time step k and the initial or "zero" sequence of the flat output $y_{\hat{n}}$ corresponding to the initial value at step n. The restriction of the acceleration is dependent on the selection of the restrictions in the planner for conditions and restrictions 5 and is not only restricted by the circular restrictions.

The observed flatness-based model-predictive distance and speed control 2 is preferably implemented with the aid of the open source optimum quadratic solver qrqp, but is not restricted to this solver and can also be solved using other quadratic or nonlinear solvers. The driving resistance of the vehicle due to the air resistance, gravity, and the inclination of the road can be incorporated directly into the dynamic model or into the limits of the secondary conditions, as is the case, for example, in the forward-backward speed planner 1.

For MPC with qrqp solver with 50 ms sampling time and N=20, for example, the calculation time is 10.7 ms.

The present disclosure therefore specifies an adaptive hybrid speed planner with distance control which is also suitable for electric vehicles (BEV).

The flexible adaptive hybrid speed planner preferably comprises a rapid and simple forward-backward speed planner 1 and open source-based optimum energy speed planner 2 having various easily adjustable comfort-based and driver-capability-based restrictions 5, stabilized by a model-predictive distance and speed control 3, which is capable of ensuring a distance control between the ego vehicle 9 and a vehicle 10 driving ahead.

LIST OF REFERENCE SYMBOLS

- 1 macro-planner
- 2 meso-planner
- 3 micro-planner
- 4 speed planner
- 5 conditions and limits
- 6 roadway conditions and roadway controls
- 7 driver-oriented and comfort-oriented limits
- 8 drivetrain limits
- 9 ego vehicle
- 10 vehicle driving ahead

What is claimed is:

1. A computer-implemented method for speed control of a ground-based vehicle, the computer-implemented method comprising:

executing a speed planner comprising a macro-planner algorithm and a meso-planner algorithm via a processor, the macro-planner algorithm performing rapid forward-backward speed planning on a first distance horizon, and the meso-planner algorithm optimizing driving time and energy consumption using an open source optimization solver on a second distance horizon;

executing, via the processor, a micro-planner algorithm comprising model-predictive control (MPC) that performs distance control relative to a vehicle driving ahead of the ground-based vehicle;

calculating, on the processor via the macro-planner algorithm or the meso-planner algorithm, a speed setpoint value based on roadway conditions, driver conditions, and drivetrain conditions of the ground-based vehicle;

optimizing, on the processor via the micro-planner algorithm based on a distance from the vehicle driving ahead of the ground-based vehicle, the calculated speed setpoint value generating a final speed setpoint value; and operating, via the processor, the ground-based vehicle using the final speed setpoint value.

2. The computer-implemented method of claim 1, wherein the micro-planner algorithm uses a single-shoot formulation and/or a multiple-shoot formulation and/or a flatness-based formulation.

3. The computer-implemented method of claim 2, wherein:

a system dynamic is eliminated from secondary conditions, and/or the micro-planner algorithm is configured as embedded software.

4. The computer-implemented method of claim 1, wherein the ground-based vehicle comprises a self-propelled electric vehicle (BEV) or a vehicle having adaptive cruise control (ACC).

5. The computer-implemented method of claim 1, wherein performing rapid forward-backward speed planning on the first distance horizon comprises executing a forward calculation during an increase of speed of the ground-based vehicle.

6. The computer-implemented method of claim 1, wherein performing rapid forward-backward speed planning on the first distance horizon comprises executing a reverse calculation for a reduction of speed of the ground-based vehicle.

7. The computer-implemented method of claim 1, wherein the operation of the ground-based vehicle comprises calculating a torque based on the final speed setpoint value.

8. A control device for speed control of a ground-based vehicle, the control device comprising:

a computing device having a processor, wherein the processor is configured to perform operations including:

executing a speed planner comprising a macro-planner algorithm and a meso-planner algorithm, the macro-planner algorithm performing rapid forward-backward speed planning on a first distance horizon, and the meso-planner algorithm optimizing driving time and energy consumption using an open source optimization solver on a second distance horizon, executing a micro-planner algorithm comprising model-predictive control (MPC) performing distance control relative to a vehicle driving ahead of the ground-based vehicle, calculating, via the macro-planner algorithm or the meso-planner algorithm, a speed setpoint value based on roadway conditions, driver conditions, and drivetrain conditions of the ground-based vehicle, optimizing, via the micro-planner algorithm based on a distance from the vehicle driving ahead of the ground-based vehicle, the calculated speed setpoint value generating a final speed setpoint value, and operating the ground-based vehicle using the final speed setpoint value.

9. The control device of claim 8, wherein the ground-based vehicle comprises a self-propelled electric vehicle (BEV) or a vehicle having adaptive cruise control (ACC).

10. The control device of claim 8, wherein performing rapid forward-backward speed planning on the first distance horizon comprises executing a forward calculation during an increase of speed of the ground-based vehicle.

11. The control device of claim 10, wherein performing rapid forward-backward speed planning on the first distance horizon comprises executing a reverse calculation during a reduction of speed of the ground-based vehicle.

12. The control device of claim 8, wherein the operation of the ground-based vehicle comprises calculating a torque based on the final speed setpoint value.

13. A computer-implemented method, comprising:

executing, via a processor, a macro-planner algorithm performing rapid forward-backward speed planning on a first distance horizon;

executing, via the processor, a meso-planner algorithm optimizing driving time and energy consumption using an open source optimization solver on a second distance horizon, executing, via the processor, a micro-planner algorithm comprising model-predictive control (MPC) that performs distance control relative to a vehicle driving ahead of the ground-based vehicle;

calculating, on the processor via the macro-planner algorithm or the meso-planner algorithm, a speed setpoint value based on roadway conditions, driver conditions, and drivetrain conditions of the ground-based vehicle;

optimizing, on the processor via the micro-planner algorithm by performing model-predictive distance and speed control relative to a vehicle driving ahead of the ground-based vehicle, the calculated speed setpoint value to generate a final speed setpoint value; and operating, via the processor, a ground-based vehicle using the final speed setpoint value.

14. The computer-implemented method of claim 13, wherein the ground-based vehicle comprises a self-propelled electric vehicle (BEV) or a vehicle having adaptive cruise control (ACC).

15. The computer-implemented method of claim 13, wherein performing rapid forward-backward speed planning on the first distance horizon comprises executing a forward calculation during an increase of speed of the ground-based vehicle.

16. The computer-implemented method of claim 15, wherein performing rapid forward-backward speed planning on the first distance horizon comprises executing a reverse calculation during a reduction of speed of the ground-based vehicle.

17. The computer-implemented method of claim 13, wherein the operation of the ground-based vehicle comprises calculating a torque based on the final speed setpoint value.

* * * * *